June 7, 1932.  A. O. BRUNGARDT  1,862,001

PROCESS OF MAKING WRENCHES

Filed June 13, 1930  6 Sheets-Sheet 1

Inventor
Alphonse O. Brungardt
By MacLeod, Calver, Copeland & Dike
Attorneys.

June 7, 1932.                A. O. BRUNGARDT                1,862,001
                        PROCESS OF MAKING WRENCHES
                  Filed June 13, 1930         6 Sheets-Sheet 3

Inventor:
Alphonse O. Brungardt
By Macleod, Calver, Copeland & Dike
Attorneys.

June 7, 1932.  A. O. BRUNGARDT  1,862,001
PROCESS OF MAKING WRENCHES
Filed June 13, 1930   6 Sheets-Sheet 4

Inventor:
Alphons O. Brungardt
By Macleod, Calver, Copeland & Dike
Attorneys

Patented June 7, 1932

1,862,001

UNITED STATES PATENT OFFICE

ALPHONSE O. BRUNGARDT, OF SCITUATE, MASSACHUSETTS

PROCESS OF MAKING WRENCHES

Application filed June 13, 1930. Serial No. 460,890.

This invention relates to a process of making wrenches, such for example, as pipe wrenches, sometimes referred to as "Stillsons", and monkey wrenches, and more particularly to a process of making such wrenches by forging.

The primary object of my invention is to provide an improved process for making wrenches having the general characteristics of those shown and described by my copending application Serial No. 461,062 filed June 14, 1930 and the continuation thereof, Serial No. 598,083 filed March 10, 1932; one which is an improvement upon the process described by my prior Patent No. 1,711,083, granted April 30, 1929; and one which is economical and generally satisfactory.

In accordance with my present process, a blank which includes the wrench bar or handle and an integral frame or housing is formed, preferably, in a hammer forging machine. The flash is removed and the blank or bar forging is then heated to proper temperature and placed in the dies of a forging machine. While in the forging machine, and by successive operations, a wholly or partially enclosed nut window or opening is formed in the frame, a longitudinal channel is pierced through the frame and intercepts the window, ears are formed on the frame adjacent the window, and a longitudinal groove may be formed in the bar extending the full length of the frame to permit insertion of a spring, in the manufacture of pipe wrenches. If, and when desired, the process may include a further step, namely, the formation of a depression or recess in the spring groove, located within the frame below the window, to serve as a seat for one portion of a spring. All of these last mentioned operations are performed, preferably, in suitable forging machine dies under one heat, although the process may be carried out in various ways. For example, the process usually involves three separate piercing operations to complete the channel and spring groove in the frame. It may prove desirable to employ only the first two piercing operations to form a portion of the channel and spring groove, and substitute for the third piercing operation, a milling cutter or cutters for the purpose of completing the channel and spring groove. The depression or recess in the spring groove may be milled after the channel, window, and spring groove have been formed in the forging machine. The window need not be formed in the forging machine, but may be milled, particularly when the wrench is designed without a bridge over the front and rear walls or portions of the window. It has been found in practice that my present process has proved to be economical and generally satisfactory.

The invention will be more fully understood from the following description when taken in connection with the accompanying drawings and the novel features thereof will be pointed out and clearly defined in the claims at the close of this specification.

In said drawings:

Figs. 9 to 16A, inclusive, are views corresponding to Figs. 1 to 8A, inclusive, illustrating the sequence of forging operations for making a wrench of slightly different form from that of the preceding figures.

Figs. 17 to 24A, inclusive, are views corresponding to the two preceding groups, Figs. 1 to 8A, and Figs. 9 to 16A, respectively, illustrating the sequence of steps in the process of forging a wrench of a further modified construction.

Figures 7, 7A:
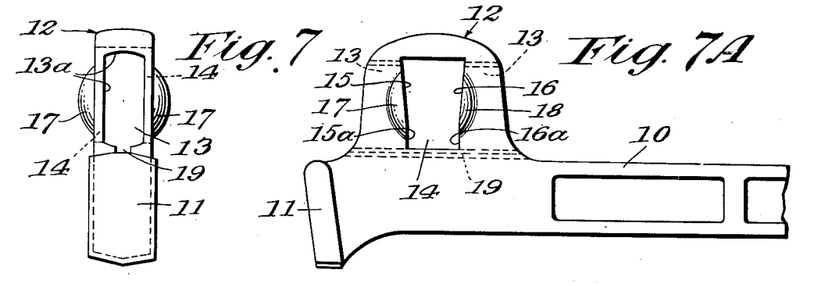
Figs. 7 and 7A are end and side elevations showing the completed wrench bar and integral frame of the preceding figures.

Referring now particularly to Figs. 7 and 7A of the drawings, one form of wrench bar with an integral frame is shown. 10 designates as a whole a bar or handle having a jaw or bit 11, and an integral frame or housing, shown as a whole at 12. The frame is provided with a longitudinal channel 13, the walls 13a of which are preferably parallel to the longitudinal axis of the bar or handle. The frame is also provided with a transverse window or opening 14, the front and rear walls 15 and 16 of which converge toward the lower wall of the channel and the bar 10. As shown, the lower end portions of the window walls are parallel, as shown at 15a and 16a. The frame has on opposite sides, adjacent the front and rear window walls, ears or projections 17 and 18, respectively, which form extensions of these walls. The frame is provided with a longitudinal spring receiving groove 19 which, as shown, extends throughout the length of the frame and is located below the longitudinal channel 13.

Figures 8, 8A:
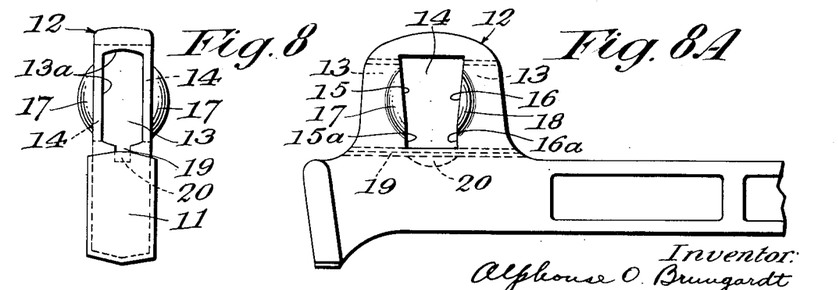
Figs. 8 and 8A are views showing the wrench of the preceding figures provided with a spring seat or depression, in addition to the spring groove.

Referring now particularly to Figs. 8 and 8A, it is sometimes desirable to provide the bar with a spring seat or depression 20, which is located within the spring receiving slot 19, and may be in the form of a "Woodruff key-slot."

In accordance with my present process of making the wrench of Figs. 7 and 7A or 8 and 8A, I have shown in Figs. 1 to 6A, inclusive, one sequence of steps or operations employed to complete the wrench.

Figure 1:
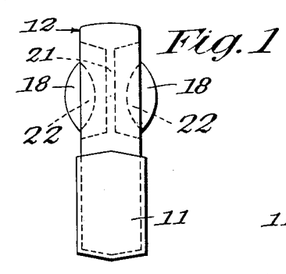
Figs. 1 and 1A are end and side elevations, respectively, of the blank after it has been removed from the first forging operation and prior to its insertion in the forging machine dies.
Figure 1A:
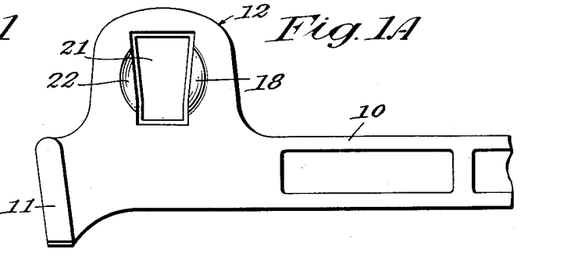
Figures 2, 2A:
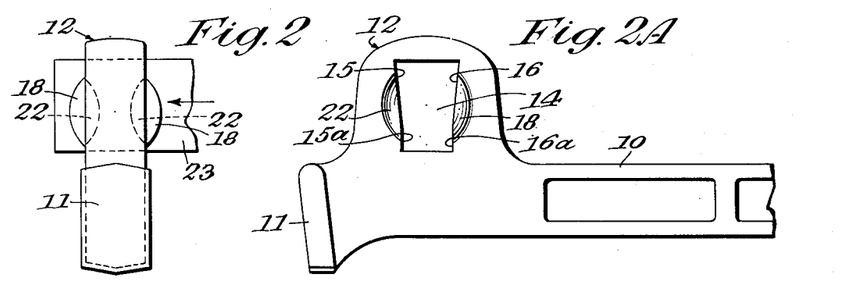
Figs. 2 and 2A are views similar to the preceding figures, illustrating the operation of punching a window or opening in the frame.

I first prepare, preferably by hammer forging, or in any other suitable forging apparatus, the blank of Figs. 1 and 2, which comprises a bar or handle 10, a jaw or bit 11, and an integral frame or housing 12, the frame having window depressions on opposite sides which define the outline of the finished window 14 of Fig. 7A. A web or partition 21 of metal separates the depressions. The frame has a pair of rear ears 18 adjacent the rear walls of the depressions. The frame also has depressions 22 formed in opposite side walls thereof adjacent to the front walls of the window depressions. After the blank, as thus described, has been formed, it is allowed to cool and the usual fin or flash is removed. It is then re-heated to a predetermined degree and placed in the dies of a suitable forging machine, in which the succeeding steps or operations of completing the bar and frame, are performed.

Figures 3, 3A:
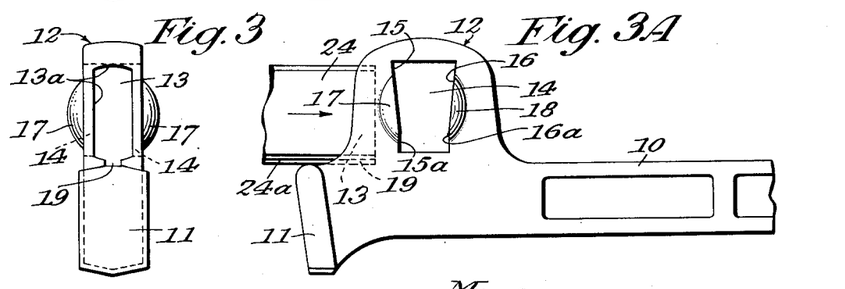
Figs. 3 and 3A illustrate the first piercing operation for forming a longitudinal channel and spring groove in the frame.
Figures 4, 4A:
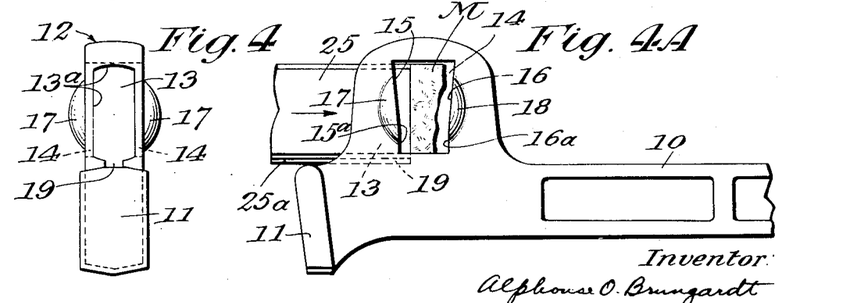
Figs. 4 and 4A illustrate the second piercing operation, showing a punched out piece or slug of metal located within the window or opening.
Figures 5, 5A:
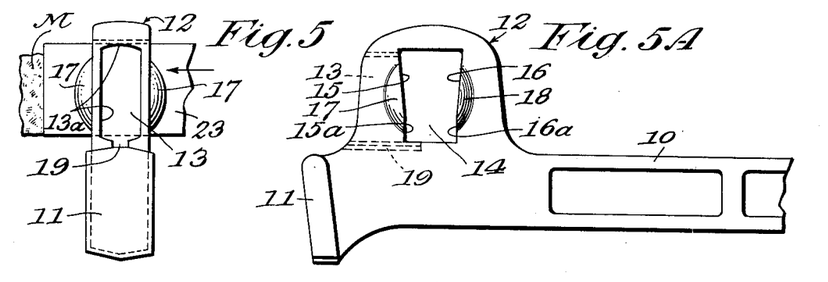
Figs. 5 and 5A illustrate the second punching operation to remove the metal slug from the window or opening.
Figures 6, 6A:
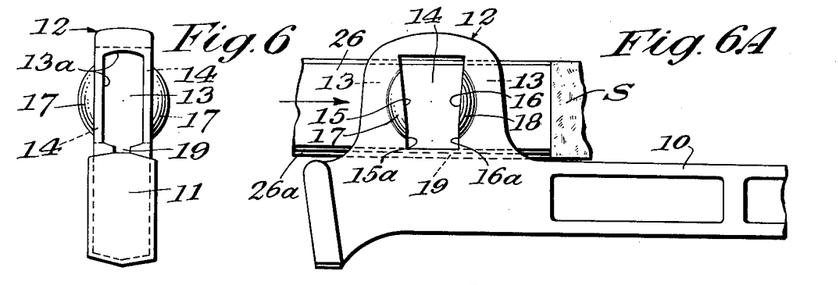
Figs. 6 and 6A illustrate the final piercing operation to complete the longitudinal channel and longitudinal spring groove.

The first operation in the forging machine is illustrated in Figs. 2 and 2A, in which the window or opening 14 is formed by means of a punch 23 which, in cross section, corresponds to the outline of the window. The next operation is performed by a piercing tool, such as the tool 24 which is provided on its under face or edge with a centrally disposed longitudinally extending rib or key 24a. As shown in Figs. 3A, the tool 24 is thrust into the metal of the frame in the direction of the arrow, and forms the first portion of the longitudinal channel and spring groove, and also forces metal ahead of it, which flows to fill the depressions 22 and form the front pair of ears 17. Suitable recesses in the dies, (not shown) which have the shape of the finished ears, receive the flowing metal displaced by the piercing tool. The second piercing operation is performed by a piercing tool 25 having a rib 25a corresponding to the rib 24a of the first piercing tool. The tool 25 enters the previously formed portions of the channel and groove in the direction of the arrow, and extends the channel and spring receiving groove to a point which intercepts the window or opening 14. During this operation a slug or chunk of metal indicated at M is pushed into the window or opening 14. The next operation is shown in Figs. 5 and 5A and is performed by the punch 23 which is thrust against, and pushes out the metal slub M, thereby clearing the window or opening. Figs. 6 and 6A illustrate the next operation which is performed by a third piercing tool 26. This tool is also provided in its lower edge with a longitudinal rib or projection 26a. The tool is forced through the partially completed channel and groove in the direction of the arrow, and engages and removes the metal within the frame to complete the longitudinal channel, and spring groove. During the piercing operation, the tool 26 removes a slug of metal S from the frame, which falls into a space within the dies. The tool is then withdrawn, and the completed bar and frame is shown in Figs. 7 and 8.

Sometimes it may be desirable to use a special form of spring with wrenches made in accordance with the foregoing process, and in such cases an additional step or operation is added to the process, which may be performed in the forging machine by a suitable die or punch to provide the bar with a spring seat or depression 20 (Fig. 8A). The spring seat may be formed after the finished bar and frame has been removed from the forging machine and cooled, in any suitable manner, as by means of a milling cutter. In other words, the step of forming the spring recess is an optional one, depending upon the form of spring which it is intended to use with the wrench.

It is to be noted that all of the operations illustrated in Figs. 2 and 8A inclusive are preferably performed in a forging machine under one heat, or if desirable, the steps illustrated in Figs. 2 to 7A inclusive may be performed in such machine, with the additional step of forming the spring seat of Fig. 8A, performed after the finished blank has been removed from the forging machine dies, in any suitable manner.

Referring to Figs. 9 to 16A inclusive, I have illustrated therein my process of forming a wrench bar and integral frame in which the frame is of slightly modified construction. The steps of the process are substantially the same as those employed to form the wrench of the preceding figures.

Figures 15, 15A:
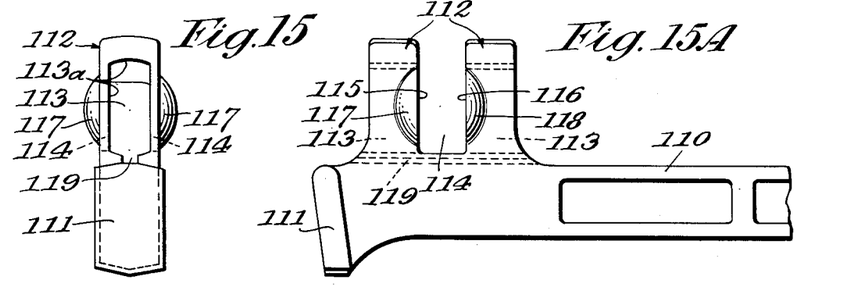

Figs. 15 and 15A show the completed bar and integral frame. The bar or handle is shown at 110 and is provided with a jaw or bit 111 and an integral frame or housing, shown as a whole at 112. The frame or housing is provided with a longitudinal channel 113 having walls 113A which are preferably parallel to the longitudinal axis of the bar or handle 110. The frame has also a transverse partially enclosed window or opening 114 provided with front and rear parallel walls 115 and 116, respectively. Adjacent the front wall 115 and on opposite sides of the frame or housing, there is provided a pair of ears or projections 117. Adjacent the rear wall 116, a similar pair of ears or projections 118, is provided. These pairs of ears form extensions of the front and rear window walls. The frame has a longitudinal spring receiving groove 119 which extends throughout the length thereof. The spring groove is located below the channel 113.

In some cases, it may be desirable to use a special form of spring with my wrench, in which cases I provide, in addition to the longitudinal spring receiving slot 119, a spring seat or recess 120, which is preferably located in the spring groove, below the window or opening 114.

Figures 9, 9A:
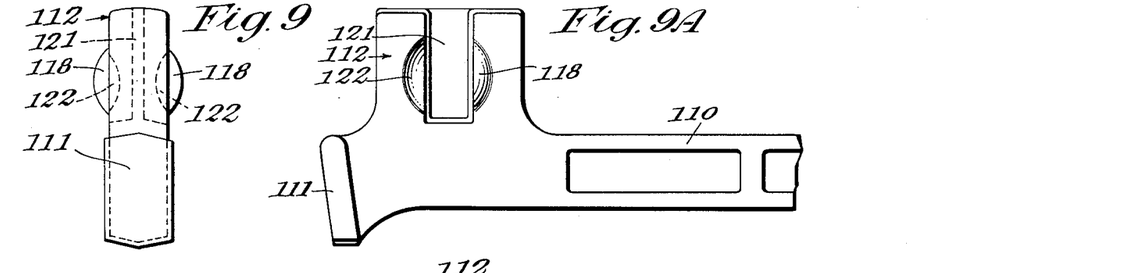

In Figs. 9 and 9A, the blank is shown as it issues from the first forging operation, which is preferably performed by a drop hammer or steam hammer, or which may be partially forged under a trip hammer or between revolving forging rolls, to produce the blank shown in these figures. The blank comprises a bar or handle 110 having a jaw or bit 111 and an integral frame or housing shown as a whole at 112. The frame or housing is provided with window depressions formed in opposite side walls, which define the outline of the finished window or opening of Fig. 15A, the depressions being separated by a web or partition 121. The frame is provided on opposite sides, with ears or projections 118 adjacent the rear walls of the window depressions. Adjacent the front walls of the window depressions, the frame is provided with depressions 122 where front ears are to be formed by a forging operation.

After the blank has issued from the first forging operation, the usual fin or flash is removed and the blank as it is shown in Figs. 9 and 9A, is heated to the proper temperature and placed in suitable dies in a forging machine. These forging machine dies have recesses formed therein to receive the ears 118, and are provided with similar recesses which register with the depressions 122.

Figures 10, 10A:
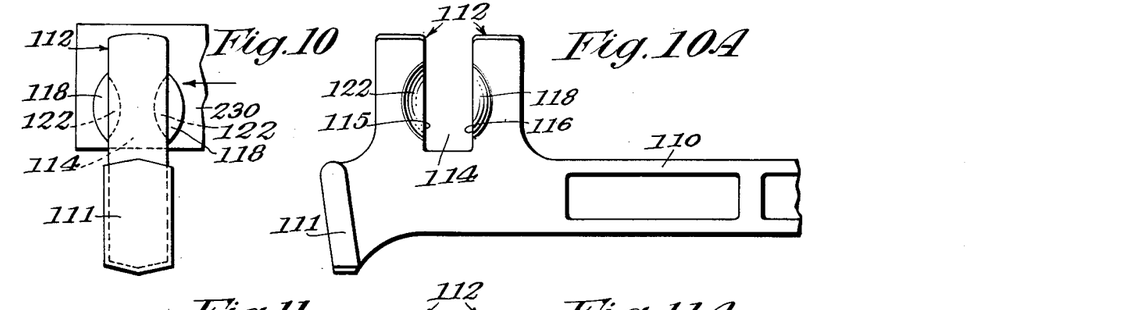
Figures 11, 11A:
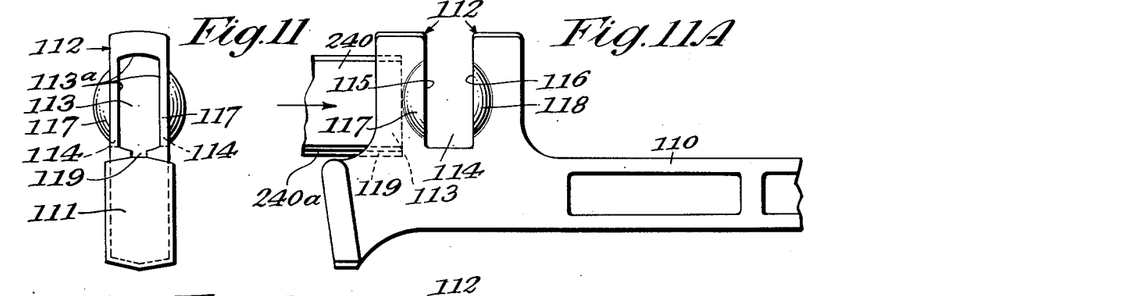

The first operation in the forging machine is illustrated in Figs. 10 and 10A and is performed by a punch 230, which in cross-section, corresponds to the shape of the completed window or opening 114 (Fig. 15A). The punch removes the metal web 121 and completes the window or opening. The next operation in the forging machine is the initial channel piercing operation which is performed by a piercing tool such as the tool 240 having on its lower edge, a centrally disposed longitudinal rib or key 240a. The piercing tool is thrust into engagement with the metal of the frame, in the direction of the arrow, and displaces the metal to form the first section of the longitudinal channel and spring receiving groove. The tool 240 pierces the metal of the frame to the extent shown in Fig. 11A. During this initial piercing operation, the front pair of ears 117 is formed simultaneously due to the fact that the metal is displaced as the piercing tool penetrates the frame and flows into the opposed recesses in the forging machine dies, previously mentioned.

Figures 12, 12A:
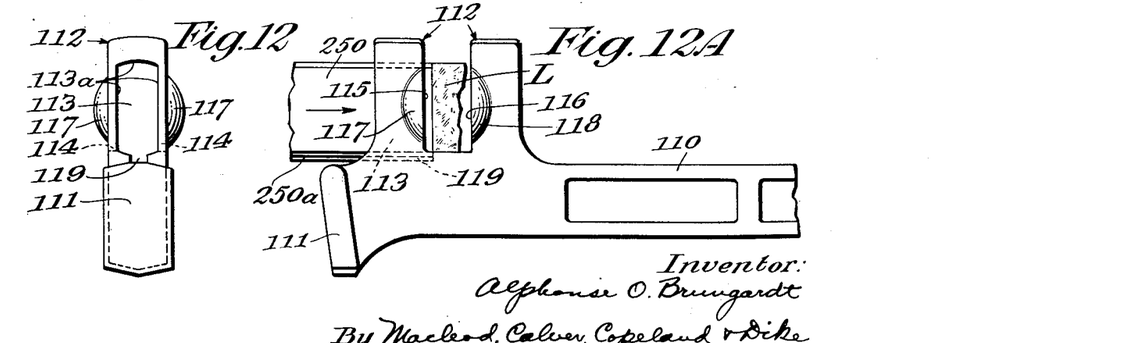

Figs. 12 and 12A illustrate the second piercing operation which is performed by a piercing tool 250 having a rib 250a. This tool is thrust into the partially formed channel and spring groove in the direction of the arrow, and displaces more metal to extend the channel and groove through to the window 114. The piercing tool forces a slug or lump of metal L ahead of it and into the space comprising the window or opening.

Figures 13, 13A:
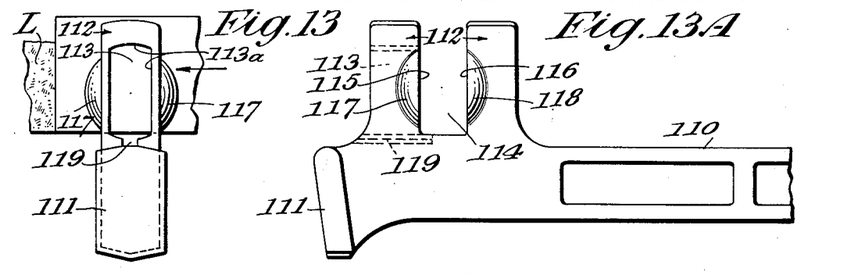
Figures 14, 14A:
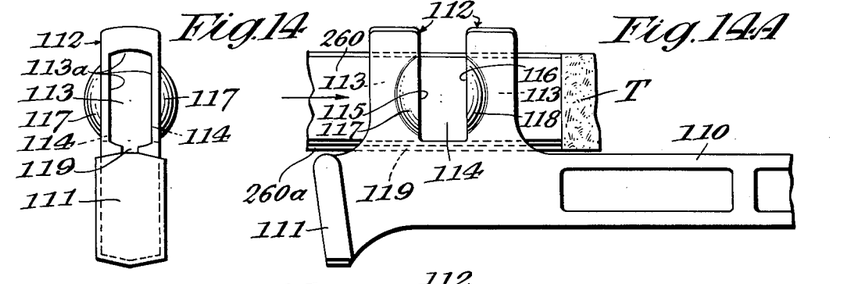

In Figs. 13 and 13A the next step of the process is illustrated, namely that of removing the slug of metal L from within the window or opening 114. This is accomplished by means of the punch 230 (Fig. 10). The next operation is the final piercing operation which is accomplished by means of a piercing tool 260 having a longitudinal rib 260A. The tool is somewhat longer than the previous piercing tools and is thrust in the direction of the arrow, to complete the channel and spring groove so that they extend entirely through the housing. During this last piercing operation, a slug of metal T is forced out of the housing in advance of the piercing tool. The tool 260 is then withdrawn and the completed bar and frame (Fig. 15A) is removed from the forging machine.

Figures 16, 16A:
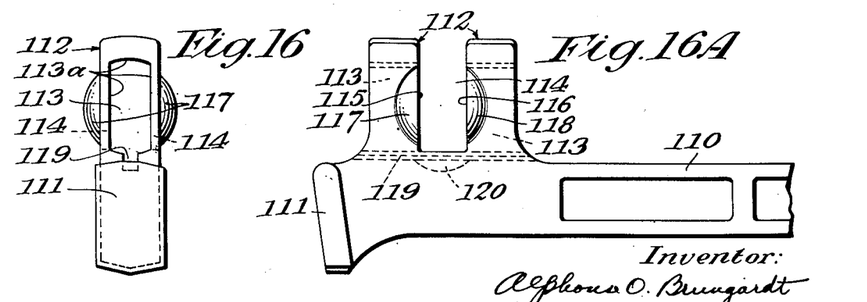

It may be desirable to employ a special form of spring with the wrench of Fig. 15A, and if so, a spring seat or recess 120 may be formed in the spring groove 119 (Figs. 16 and 16A). This seat may be formed while the blank is in the forging machine, or later, after the blank has been removed and cooled, in any suitable manner, as for example, by means of a milling cutter. The recess resembles that of Fig. 8 and is preferably in the form of a "Woodruff key-slot".

The window need not be formed in the forging machine but may be milled, particularly when the wrench is designed without a bridge over the front and rear portions or walls of the window.

Figures 21, 21A:
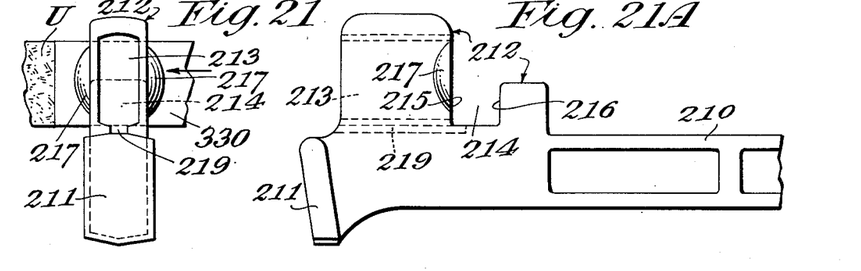
Figures 22, 22A:
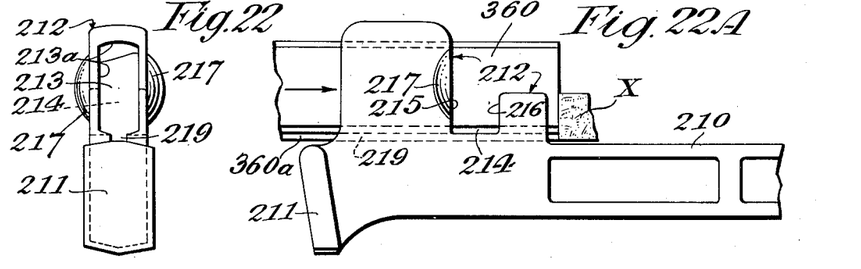
Figures 23, 23A:
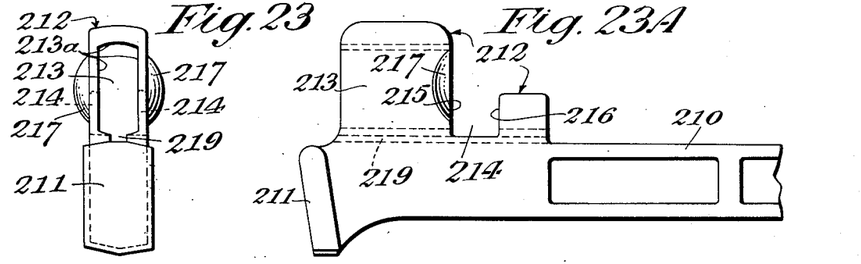

Referring now to Figs. 17 to 24A inclusive there is shown a further modified form of wrench which, however, is formed by substantially the same process as was employed to form the wrenches of the preceding figures. The completed bar and integral frame, in accordance with this latest form, is shown in Figs. 23 and 23A. The wrench bar or handle is shown at 210. It comprises a jaw or bit 211 and an integral frame or housing, shown as a whole at 212. The housing is provided with a longitudinal channel 213 having walls 213a which are preferably parallel to the longitudinal axis of the bar. The frame is also provided with a partially enclosed transverse opening or window 214, having front and rear parallel walls 215 and 216, respectively. The housing has a pair of ears 217 formed on opposite side walls which are positioned adjacent the front wall 215 of the window or opening. These ears provide lateral extensions of the front wall of the window. The bar is also provided with a longitudinal spring groove 219.

Figures 24, 24A:
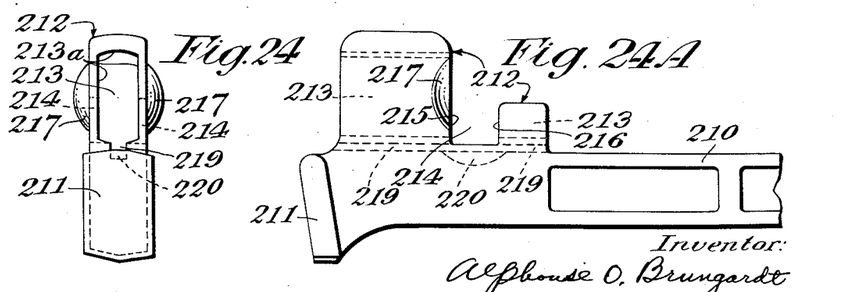

As was the case with the two preceding forms of wrenches, it may be desirable to use a special type of spring with the present wrench, and by reference to Figs. 24 and 24a, it will be seen that there is shown a spring seat or recess 220 located within the spring groove 219 and positioned below the window 214. The use of the spring recess is optional.

Figures 17, 17A:
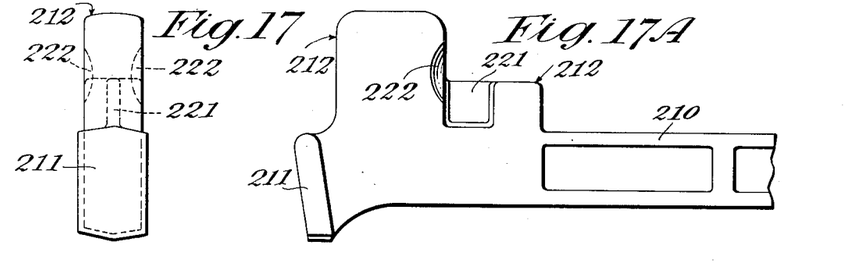

Referring now to Figs. 17 and 17A the original blank is shown as it issues from the first forging operation, which may be performed by a drop hammer or steam hammer, or partially forged under a trip hammer or between revolving forging rolls. After the blank has been removed from the first forging operation the usual fin or flash is removed, and the blank is then in readiness to be placed in the dies of the forging machine. As shown, the blank comprises a bar or handle 210 having a jaw or bit 211 and an integral frame or housing, shown as a whole at 212. The housing is provided on opposite faces or sides with window depressions which describe the outline of the finished window or opening 214, which is completed by a subsequent operation. These depressions are separated by a web or partition 221. The frame is also provided on opposite side walls with a pair of depressions 222 located adjacent the front walls of the window depressions.

Figures 19, 19A:
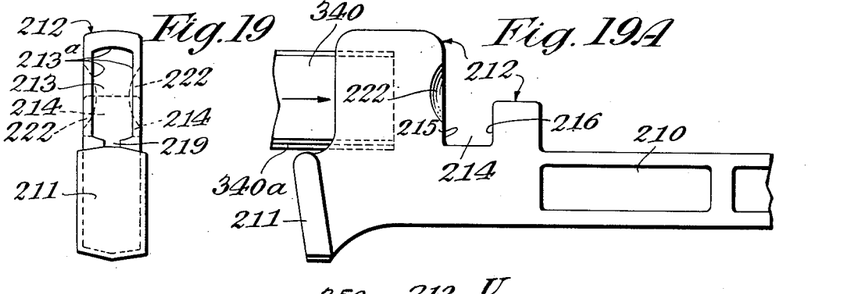
Figures 20, 20A:
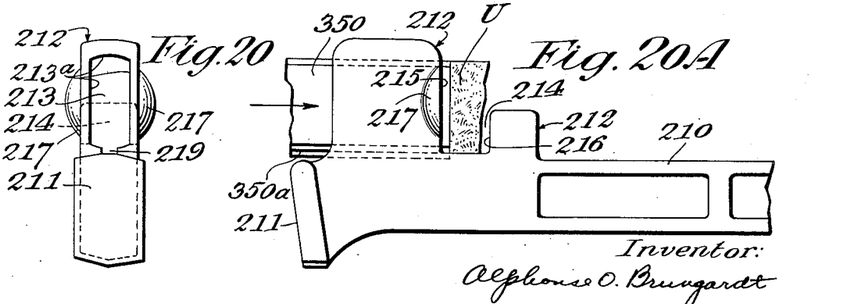

The blank is placed in the forging machine dies and the first operation consists of a punching operation, performed by a punch 330 which removes the web between the depressions 221 and forms the partially closed window or opening 214. The next operation is illustrated in Figs. 19 and 19a and constitutes the first piercing step of forming the longitudinal channel and spring groove. This work is performed by a piercing tool 340 having on its lower face or edge, a longitudinal centrally disposed rib or key 340a. The tool is thrust into engagement with the metal of the frame, in the direction of the arrow and pierces the frame to the extent shown in Fig. 19a, the rib 340a forming, simultaneously, the forward portion or section of the spring groove. During the formation of the longitudinal channel and spring groove, some of the metal within the housing is displaced by the tool, and flows into opposed recesses in the forging dies to build up or form the ears 217. The next operation is performed by a second piercing tool 350, relatively longer than the other piercing tools, and which likewise, has a rib or key 350a. The tool is thrust forward in the direction of the arrow (Fig. 20A) and extends the longitudinal channel and spring groove simultaneously through the frame to the window or opening 214. During this operation, the tool 350 removes a slug or lump of metal U from within the housing and forces it into the space forming the window.

Figures 18, 18A:
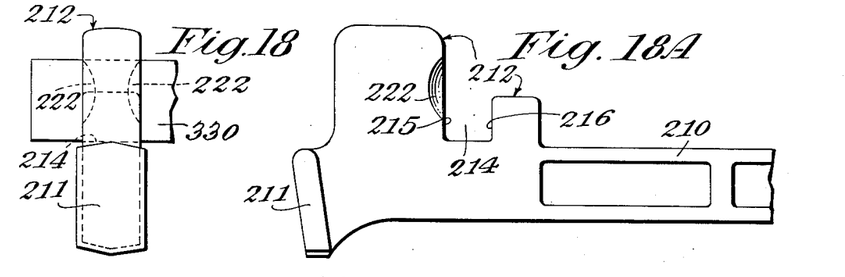

The next operation is illustrated in Figs. 21 and 21a and is performed by the punch 330 (Fig. 18). This punch is brought into engagement with the slug of metal U and removes it from within the window or opening 214.

The next operation is a piercing operation and is performed by a piercing tool 360 having a rib or key 360a. Referring to Fig. 22 it will be seen that the piercing tool 360 is thrust through the partially completed channel and spring groove in the direction of the arrow, and completes the longitudinal channel through the rear portion of the frame, and simultaneously extends the spring grove entirely through the housing. It will be noted that a slug of metal X is pushed out from within the housing ahead of the piercing tool. The completed wrench is shown in Figs. 23 and 23a. As previously referred to, if it should be desirable to form a wrench capable of receiving a special type of spring, the additional step of forming the spring seat or recess 220 may be performed. This step of the process is, of course, optional and may be performed in the forging machine, or subsequent to the removal of the wrench bar and frame from the machine, in any suitable manner, as by means of a suitable milling cutter.

Referring further to the process illustrated in Figs. 17 to 24A inclusive, it may prove desirable to complete the rear end portion of the longitudinal channel and the spring groove in the housing 212, by means of a milling cutter, or cutters, one to complete the longitudinal channel, and the other to extend or complete the spring groove. In other words, the operation performed by the milling cutters would supplant that performed by the piercing tool 360 (Fig. 22A).

The window need not be formed in the forging machine but may be milled, particularly when the wrench is designed without a bridge over the front and rear portions or walls of the window.

From the foregoing, it will be seen that I have devised an entirely new process of making wrench bars having integral frames or housings, by forging, in accordance with which the original blank or forging, formed by a hammer forging press, or by any other suitable forging operation, is re-heated to the proper temperature and transferred to a forging machine. This machine performs the necessary additional operations or steps to complete the bar and frame, the frame having a longitudinal channel, a spring groove, and a transverse window or opening which intercepts the longitudinal channel, under a single heat, so that the forgings removed from the machine require only the usual finishing operations to make them in readiness for assembly.

While I have illustrated three forms of wrench bars and frames which may be made by my process, the invention contemplates the use of the process for making any and all types of forged wrench bars and frames in which the bar or handle and frame or housing are integral, with or without a wholly or partially closed window or opening. It is, of course, within the purview of my invention to form wrench bars and frames in accordance with the foregoing process which may include any or all of the foregoing steps in any sequence desired. The particular sequence of steps mentioned, constitutes only one way of carrying out my process.

I claim:

1. The hereindescribed process of making wrenches having a bar or handle and a frame or housing forged integrally therewith, said frame or housing having a channel and a window intercepting one another and also having pairs of ears or projections adjacent the front and rear walls of said window, which consists in forging the bar and frame and one pair of ears in a single operation, and by separate operations punching out the window in said frame, piercing a longitudinal channel part way through the frame and simultaneously forming the other pair of ears, removing surplus metal from within said window, and completing the piercing operation to extend the channel entirely through the frame.

2. The hereindescribed process of making wrenches having a bar or handle and a frame or housing formed integrally therewith, said frame or housing having a longitudinal channel and a window intercepting one another, said frame having a spring groove formed therein, which consists in forging the bar and frame in a single operation, and by separate operations in a forging machine, punching out the window in the frame, piercing a longitudinal channel part way through the frame and simultaneously forming a part of the spring groove in the frame, punching out the surplus metal from within the window, and further piercing the frame to complete the channel and simultaneously extend the spring groove in the frame.

3. The hereindescribed process of making wrenches having a bar or handle and a frame or housing formed integrally therewith, said frame or housing having a longitudinal channel and a window intercepting one another and also having pairs of ears or projections adjacent the front and rear walls of said window, said frame having a longitudinal spring groove formed therein, which consists in forging the bar and frame and one pair of ears in a single operation, and by separate operations in a forging machine, punching out the window in said frame, piercing a longitudinal channel part way through the frame and simultaneously forming the other pair of ears and a part of the spring groove in said frame, punching out the surplus metal from within the window, and piercing the frame to complete the channel therethrough and at the same time complete the spring groove in said frame.

4. The hereindescribed process of making wrenches having a bar or handle and a frame or housing formed integrally therewith, said frame or housing having a channel and a window intercepting one another, and having a spring receiving recess in the frame, which consists in forging the bar and frame in a single operation, and by separate operations in a forging machine, punching out the window in the frame, piercing a longitudinal channel part way through the frame, punching out surplus metal from within the window, completing the channel through the frame, and forming a spring receiving recess in the frame.

5. The hereindescribed process of making wrenches having a bar or handle and a frame or housing forged integrally therewith, said frame or housing having a channel and a window intercepting one another, pairs of ears or projections adjacent the front and rear walls of said window, said frame having a spring receiving groove therein, and also having a spring receiving recess located in said groove, which consists in forging the bar and frame and rear pair of ears in a single operation, and by separate operations in a forging machine, punching out the window in the frame, piercing a longitudinal channel part way through the frame and at the same time forming a part of the spring receiving groove in the frame and the front pair of ears, punching out the surplus metal from within the window, piercing the frame to complete the channel therethrough and to extend the spring groove in the frame, and forming a spring receiving recess in said groove.

6. The process of making wrenches, comprising forging an integral frame at one end of a bar or handle, said frame having a pair of ears and a pair of depressions spaced therefrom, punching a window in said frame intermediate the ears and depressions, and thereafter piercing a window-intercepting channel in said frame and simultaneously forming a second pair of ears in place of said depressions.

7. The hereindescribed process of making wrenches having a bar or handle and a frame or housing forged integrally therewith, said frame or housing having a channel and a window intercepting one another and also having pairs of ears or projections adjacent the front and rear walls of said window, which consists in forging the bar and frame and one pair of ears in a single operation, and by separate operations punching out the window in said frame, piercing a longitudinal channel part way through the frame and simultaneously forming the other pair of ears, and completing the piercing operation to extend the channel entirely through the frame.

8. The hereindescribed process of making wrenches having a bar or handle and a frame or housing forged integrally therewith, said frame or housing having a channel and a window intercepting one another, and also having a pair of ears or projections adjacent one of the window walls, which consists in forging the bar and frame in a single operation, and by separate operations forming a window in said frame, piercing a longitudinal channel part way through the frame and simultaneously forming the pair of ears, and completing the channel to extend entirely through the frame.

9. The hereindescribed process of making wrenches having a bar or handle and a frame or housing forged integrally therewith, said frame or housing having a channel and a window intercepting one another and also having a pair of ears or projections adjacent one of the window walls, which consists in forging the bar and frame in a single operation, and by separate operations milling a window in said frame, piercing a longitudinal channel part way through the frame and simultaneously forming the pair of ears, and milling the channel to extend entirely through the frame.

In testimony whereof I affix my signature.

ALPHONSE O. BRUNGARDT.